(12) United States Patent
Petersen

(10) Patent No.: US 9,192,141 B2
(45) Date of Patent: Nov. 24, 2015

(54) IMPLEMENT FOR KEEPING DAIRY ANIMALS

(75) Inventor: Gerth Petersen, Rodekro (DK)

(73) Assignee: LELY PATENT N.V., Maassluis (NL)

(*) Notice: Subject to any disclaimer, the term of this patent is extended or adjusted under 35 U.S.C. 154(b) by 162 days.

(21) Appl. No.: 12/794,812

(22) Filed: Jun. 7, 2010

(65) Prior Publication Data

US 2010/0236486 A1    Sep. 23, 2010

Related U.S. Application Data

(63) Continuation of application No. PCT/NL2008/000260, filed on Nov. 27, 2008, and a continuation-in-part of application No. 12/510,305, filed on Jul. 28, 2009.

(30) Foreign Application Priority Data

Dec. 6, 2007   (NL) ...................................... 1034796

(51) Int. Cl.
*A01K 1/00* (2006.01)
*A01K 1/12* (2006.01)
*A01K 29/00* (2006.01)

(52) U.S. Cl.
CPC ... *A01K 1/12* (2013.01); *A01K 1/00* (2013.01); *A01K 1/0041* (2013.01); *A01K 1/0088* (2013.01); *A01K 29/00* (2013.01)

(58) Field of Classification Search
CPC .......... A01K 1/0088; A01K 1/00; A01K 1/12
USPC ................................ 119/14.02, 14.03, 14.04
See application file for complete search history.

(56) References Cited

U.S. PATENT DOCUMENTS

| 2,039,562 | A | | 5/1936 | Shodron |
| 2,472,122 | A | * | 6/1949 | Polivka ...................... 119/14.03 |

(Continued)

FOREIGN PATENT DOCUMENTS

| DE | 8702216 U |   | 4/1987 | |
| EP | 168845 A1 | * | 1/1986 | ............... A01K 1/00 |

(Continued)

OTHER PUBLICATIONS

International Search Report and Written Opinion of PCT/NL2008/00260.

(Continued)

*Primary Examiner* — Rob Swiatek
*Assistant Examiner* — Danielle Clerkley
(74) *Attorney, Agent, or Firm* — Hoyng Rokh Monegier LLP; Minerva Rivero; Ramin Amirsehhi

(57) ABSTRACT

An implement for keeping dairy animals, provided with a first and a second production unit and with a care unit having a plurality of subunits, wherein each production unit is provided with at least one accommodation area for a production group, which comprises a group of lactating dairy animals, and with a milking implement for milking the production group, wherein the subunits of the care unit at least include a calving unit for separately accommodating dairy animals in a calving period, and a milking implement for milking newly calved dairy animals, and an infirmary unit for separately accommodating sick animals, and wherein the care unit forms a connection between the production units. There is thus provided a compact disposition, comprising efficient and short distances, for dairy animals requiring care.

13 Claims, 3 Drawing Sheets

(56) References Cited

U.S. PATENT DOCUMENTS

| | | | | |
|---|---|---|---|---|
| 3,223,070 | A * | 12/1965 | Gribble et al. | 119/14.03 |
| 3,246,631 | A * | 4/1966 | Holm | 119/14.03 |
| 4,000,718 | A * | 1/1977 | Brown | 119/14.03 |
| 5,782,199 | A * | 7/1998 | Oosterling | 119/14.03 |
| 6,186,093 | B1 * | 2/2001 | Finn et al. | 119/14.03 |
| 6,341,582 | B1 * | 1/2002 | Gompper et al. | 119/840 |
| 6,516,744 | B1 * | 2/2003 | Bjork et al. | 119/14.02 |
| 7,874,263 | B2 * | 1/2011 | Schulte | 119/14.02 |
| 8,079,325 | B2 * | 12/2011 | Van Hoven | 119/14.03 |
| 2007/0137579 | A1 | 6/2007 | Osthues et al. | |

FOREIGN PATENT DOCUMENTS

| | | |
|---|---|---|
| EP | 0677243 A2 | 10/1995 |
| WO | 2004068940 A | 8/2004 |

OTHER PUBLICATIONS

Midwest Plan Service (MWPS) 72354: Dary Barn-200 Free Stalls, 1974.

Desigh of Speces to Enhance Gown Management and Care, Department of Agricultural and Biological Engineering, Clemson University, 2000, John P. Chastain, 2000.

Design Information for Housing Special Dairy Cows, Pennsylvania State University, (written for presentation at the 2006 ASABE Annual International Meeting, Jul. 9-12, 2006), Prof. Robert E. Graves et al., Jul. 9 to 12, 2006.

Design Information for Housing Special Dairy Cows, NRAES-200 (Jul. 2006), Prof. Robert E. Graves et al., Jul. 2006.

Housing design for Cattle—Danish Recommendations, interdisciplinary report, third revised edition (2002—official english translation), The Danish Agricultural Advisory Centre, Nov. 2002.

"Animal Welfare: A Cool Eye Towards Eden", Blackwall Science, 1995, pp. 178-180, Webster, J., 1995.

Opposition filed by DeLaval International AB on Mar. 1, 2012.

A plan showing a dairy barn layout for Bleckenstad Farm, Mjölby, Sweden, [www.delaval.com/imageVaultFiles/id950/cf5/Bleckenstad] as cited on Aug. 16, 2012 in the Opposition Proceedings to EP2219437B1 by DeLaval International A.B.

Declaration of Mr. Mats Johansson dated Aug. 15, 2012 as cited on Oct. 25, 2013 in the Opposition Proceedings to EP2219437B1 by DeLaval International A.B.

Declaration of Ms Malin Keijser Bergoo dated Oct. 23, 2013 as cited on Oct. 25, 2013 in the Opposition Proceedings to EP2219437B1 by DeLaval International A.B.

Declaration of Mr Anders Sandberg dated Oct. 23, 2013 as cited on Oct. 25, 2013 in the Opposition Proceedings to EP2219437B1 by DeLaval International A.B.

Certified 1984 copy of the May 1984 third edition of "Handbook of Building Plains" as cited on Nov. 22, 2013 in the Opposition Proceedings to EP2219437B1 by DeLaval International A.B.

MWPS directory page as cited on Nov. 22, 2013 in the Opposition Proceedings to EP2219437B1 by DeLaval International A.B.

Page 1032 of the Shorter Oxford English Dictionary, Third Edition, vol. I, reprint 1988 as cited on Oct. 15, 2012 in the Opposition Proceedings to EP2219437B1 by DeLaval International A.B.

Page 736 of the Collins Dictionary of the English language as cited on Oct. 15, 2012 in the Opposition Proceedings to EP2219437B1 by DeLaval International A.B.

Free dairy building plans [http://web.archive.org/web/20010903150242/http://www.public.iastate.edu/~mwps_web/d_plans.html] as cited on Oct. 25, 2013 in the Opposition Proceedings to EP2219437B1 by DeLaval International A.B.

Internet Archive Wayback Machine , E6 "Index of /~mwps_dis/mwps_web/"[http://www.public.iastate.edu/~mwps_dis/mwps_web/] as cited on Oct. 25, 2013 in the Opposition Proceedings to EP2219437B1 by DeLaval International A.B.

Internet Archive Wayback Machine , E7 "Index of /~mwps_dis/mwps_web/" [http://www.public.iastate.edu/~mwps_dis/mwps_web/] as cited on Oct. 25, 2013 in the Opposition Proceedings to EP2219437B1 by DeLaval International A.B.

Internet Archive Wayback Machine , "Free Dairy Building Plans" [http://www.public.iastate.edu/~mwps_dis/mwps_web/d_plans.html] as cited on Oct. 25, 2013 in the Opposition Proceedings to EP2219437B1 by DeLaval International A.B.

"Your round the clock cow traffic assistant—DeLaval smart selection gate SSG for VMS" as cited on May 27, 2014 in the Opposition Proceedings to EP2219437B1 by DeLaval International A.B.

\* cited by examiner

IMPLEMENT FOR KEEPING DAIRY ANIMALS

CROSS REFERENCE TO RELATED APPLICATIONS

This application claims priority from Netherlands application number 1034796 filed on 6 Dec. 2007 and is a continuation of PCT application number PCT/NL2008/000260 the contents of which are hereby incorporated by reference in their entirety.

BACKGROUND OF THE INVENTION

1. Field of the Invention

The present invention relates to an implement for keeping dairy animals. In particular, the invention relates to such an implement intended for large numbers of dairy animals, in the order of a plurality of hundreds of dairy animals. However, it is not excluded to apply the invention to smaller numbers of dairy animals.

2. Description of the Related Art

Implements for keeping dairy animals, having a plurality of production units, in which lactating dairy animals are kept, are known.

A problem of such implements is that they soon become complex because of their size, it being very time-consuming for the manager to provide the care required.

Thus, there is a particular need for an implement of the mentioned type which does not, or at least to a reduced extent, have the mentioned drawback, and in particular enabling an operation which is little time-consuming.

BRIEF SUMMARY OF THE INVENTION

The present invention addresses these problems by providing a more efficient implement for keeping dairy animals.

The invention achieves this object by means of an implement for keeping dairy animals, provided with a first and a second production unit and with a care unit having a plurality of subunits, wherein each production unit is provided with at least one accommodation area for a production group, which comprises a group of lactating dairy animals, and a milking implement for milking the production group, and wherein the subunits of the care unit at least comprise a calving unit for separately accommodating dairy animals in a calving period, and a milking implement for milking newly calved dairy animals, and an infirmary unit for separately accommodating sick animals, wherein the care unit forms a connection between the production units. Such an implement enables efficient management. The production dairy animals, which do not require individual attention, are lodged in production units, while the other groups, which require attention, such as in particular sick dairy animals and calving animals, are accommodated in the care unit. By sick animals are also meant animals that are healthy per se but are somewhat difficult to milk, such as cows having three teats or animals having a handicap, such as lameness. The care unit forms a connection between the production units, so that the attention can be concentrated on the care unit, which, as a result thereof, is to a greater or lesser extent located centrally, while the production units can be reached quickly, and preferably directly, from said care unit. Owing to this, the distances to be covered are very short, both for the manager or other operating person, and for the dairy animals.

The present application describes milk boxes comprising a milking implement. However, in some cases, by milking implement will also be meant the whole of a milk box comprising a milking implement proper. This will be determined by the context.

It is pointed out in PCT/NL/2007/000238, hereby incorporated by reference in its entirety, discloses an implement having one or more production sheds and a calving shed. However, a separate unit for sick cows is not mentioned.

In the present invention, it holds that the connection is preferably a walkable connection, such as a walking path. However, it may also relate to a connection between buildings. Advantageously, the production units and the care unit are all accommodated in a separate building section, more advantageously in separate buildings. By a building section is meant a part of a building which comprises an external wall at three sides, such as a wing, and by a separate building is meant a building having an external wall at four sides. In this case, connecting elements, if any, such as whether or not covered and/or closed corridors, which occupy less than half of the relevant side, and in particular less than a quarter of said side, are not taken into consideration. The advantage of such separate building sections or buildings is that the, in particular natural, ventilation of the internal area can be sufficiently guaranteed.

As described in the foregoing, the care unit comprises a plurality of subunits. These may, advantageously, also be accommodated in separate buildings or building sections, but, of course, at least in separate areas. In particular, if the infirmary unit is accommodated in a separate building, possible danger of infection will be reduced.

The mentioned calving period refers, incidentally, to a somewhat adaptable period of time, which relates to the time just before, during and after the actual calving. This period of time comprises, for example, a spreading in the (calculated) moment of actual calving, a period of time which is used in preparation to calving, or as a period to recover from calving, etc. Each manager can previously select this calving period according to his/her wishes.

Advantageously, the milking implement(s) of at least one, and preferably each, production unit is (are) positioned at a side thereof which is contiguous to the care unit. This guarantees that those parts of the production units that, on average, will require most attention, maintenance and the like, will be positioned closest to the care unit. Also this contributes to, on average, shorter distances to be covered, and a greater efficiency.

In particular, the subunits of the care unit comprise a dry animal unit for separate accommodation of dry dairy animals. Dry dairy animals, i.e. non-lactating dairy animals, require less care and receive different feed than lactating dairy animals. The accommodation may be designed in a simpler manner and so as to give access to feed different from that of the production unit. Also in this case, it may be advantageous to accommodate the dry animal unit in a separate building, at least a separate building section. This may, also in this case, improve the ventilation.

In embodiments, the care unit comprises an area provided with a free cubicle. For particular animals, such as lame and heavily pregnant dairy animals, such an area in which a dairy animal can choose her own lying place is to be preferred to a cubicle area. A cubicle allows an animal only a limited lying space which, moreover, is accessible from only one side.

Advantageously, the production units are elongate and have their short side facing the care unit. Elongate production units offer a favourable possibility to achieve, in particular natural, ventilation. The short side facing the care unit ensures a compact disposition. Moreover, it is very simple to enlarge the capacity of the implement by extending one or more production units, whilst maintaining the advantages of the invention.

The number of production units of the implement is not particularly limited, but comprises in particular at least three production units, the care unit connecting all at least three production units. In this case, there are preferably provided two production units which are in alignment. The entire configuration of the implement may then be in the form of a small letter "h". Other dispositions, such as those in which the care unit comprises an imaginary centre (by imaginary center is meant a central point, not necessarily marked or designated, but a centre position in the care unit), and the implement comprises at least three elongate production units, and all production units have their short side facing the centre, preferably in a star-shaped manner, such as a three-armed star having a mutual angle of 120 degrees, are, of course, also possible.

In other embodiments, the implement comprises four production units, which are disposed in H-shape. In this case, two production units are each time disposed in alignment and parallel to the two other production units. In this embodiment, like in the above-mentioned embodiment comprising three production units, it is possible to combine two, or each time two, production units to form a large building. However, in this case there is a risk of insufficient ventilation, which either adversely affects the health of the dairy animals, or is the reason for often expensive additional ventilation measures. Therefore, in this case, the disposition having separate production units according to the invention offers certain advantages.

In embodiments, at least one of the subunits is provided at least in duplicate. In other words, the implement comprises at least two calving units, dry animal units and/or infirmary units. This may, for example, offer advantages in relation to the surveyability of the group of dairy animals to be accommodated therein, to the prevention of possible danger of infection caused by too large groups of segregated animals, or to the wish to provide separate subunits per production group, so that all animals of said production group and the associated subunits will, in each case, continue to form a group as a whole. This could not only promote quietness and/or calmness among the animals, but, in this case, also counteract the transmission of contagious diseases to other production groups.

Advantageously, the milking implement of the production unit comprises a milking robot. Especially in the case of such an automated milking implement, the amount of work in the production group is strongly reduced, and the advantages of the invention reveal themselves clearly, because the "real" work can then practically be limited to the care unit. More precisely, it holds that in particular the supervision by experienced personnel, such as a veterinary surgeon, should preferably be limited to a central and limited area, namely the care unit. Insofar as the production units require supervision, this can usually be carried out by less experienced personnel, which makes the implement more efficient. All these things apply in particular if at least the production groups are provided with an automatic feeding device for feeding the dairy animals of the relevant production group. This results in a substantially autonomous unit, diseases and other unforeseen circumstances not being taken into account.

In one embodiment according to the invention, each production unit comprises two accommodation areas for a matching production group and/or each accommodation area comprises at least two milking robots for milking dairy animals of the production group. Advantageously, an implement according to the invention comprises a passage provided with an identification device to identify a dairy animal and let it pass selectively, which passage forms a connection between two subunits or between a production unit and the care unit, and also comprises a controlling computer for controlling the passage. This provides the possibility of making a desirable split in two per production unit, for example in the case of two separate insemination periods. For example, one sub-group can then remain segregated from the other, and can also be transferred separately to a calving unit, if desired. This is labour-saving.

In another embodiment, at least one production unit comprises at least two milk boxes, one clean access area, separated from the accommodation area, for access to the milk boxes, and at least one segregation area, separated from the production area and the access area, for dairy animals to be segregated from the production group. In this case, in particular, but not necessarily, the number of milk boxes is larger than the number of segregation areas, at any rate for at least one access area the matching number of milk boxes is larger than the number of segregation areas, and, between the milk boxes, there is provided a controllable passage which is arranged to lead a to be segregated dairy animal from a first milk box, via a second milk box, to the segregation area. A separated clean access area comprises especially an area for access to the milking implements of the milk boxes, such as milking robots, without the necessity of walking through an accommodation area, in particular over a shed floor. This has the advantage of cleaner working, reduced risk of contamination, infection, etc. However, if no segregation area per milk box is provided, and moreover more than two milk boxes per separate clean access area are provided, the mentioned embodiment will be favourable. Otherwise, it is not simple to lead a dairy animal that, on the basis of the findings, should be segregated in the milking robot box, which is not directly located next to the segregation area, to the segregation area, of course without crossing the clean access area. By leading a dairy animal from such a more remote milk box, via that milk box that is located next to the segregation area, and if desired via one or more intermediate milk boxes, this problem can be solved.

In this case, the controllable passage may comprise one or more gates which are controllable by a control unit and which either release a passage from the milk box to the accommodation area (i.e. the normal exit), or form a passage to a next milk box. One of ordinary skill in the art can perform this in a simple manner, whether or not with the aid of the accompanying drawing and the description thereof.

Incidentally, the advantage of the mentioned embodiments comprising the controllable passage also reveals itself in implements different from those according to the first aspect of the invention. Therefore, the invention further relates to an implement for keeping dairy animals, provided with an accommodation area for a production group, which production group comprises a group of lactating dairy animals, at least two milk boxes and at least one segregation area, separated from the accommodation area, for dairy animals to be segregated from the production group, characterized in that, between the milk boxes, there is provided a controllable passage which is arranged to lead a to be segregated dairy animal from a first milk box, via a second milk box, to the segregation area.

By leading dairy animals to be segregated to the segregation area via an existing milk box, no separate access path from the first milk box to the segregation area is required. This saves labour and fencing. It is thus also possible to lead dairy animals from a plurality of milk boxes to a single segregation area.

In another embodiment, the milk box comprises a milking robot for automatically connecting teat cups to the teats of a dairy animal. Such a milk box is capable of operating fully automatically and comprises an automatically controllable entrance and exit gate. It is thus possible to use these gates in an advantageous manner for automatically leading a dairy animal to a second milk box.

In a further embodiment, the implement comprises a clean access area, separated from the accommodation area, for allowing an operator access to the milk boxes. This makes it possible for an operator to reach the milk boxes without walking over a surface which is contaminable by the dairy animals. Preferably, a milk box has a clean long side, provided with control and regulation means and contiguous to the clean access area, and a dirty long side provided with an entrance and exit gate for the dairy animal.

It is further advantageous if the number of milk boxes is larger than the number of segregation areas. In this manner, the same clean access can be used to have access to a plurality of milk boxes, which is space-saving. In the case of a clean access area, the possibilities of leading animals from a plurality of milk boxes to a segregation area are still somewhat more limited, so that in this case the advantage of this aspect of the invention comes out to a still greater extent.

BRIEF DESCRIPTION OF THE DRAWINGS

The features and advantages of the invention will be appreciated upon reference to the following drawings, in which.

DESCRIPTION OF ILLUSTRATIVE EMBODIMENTS

Figure 1:
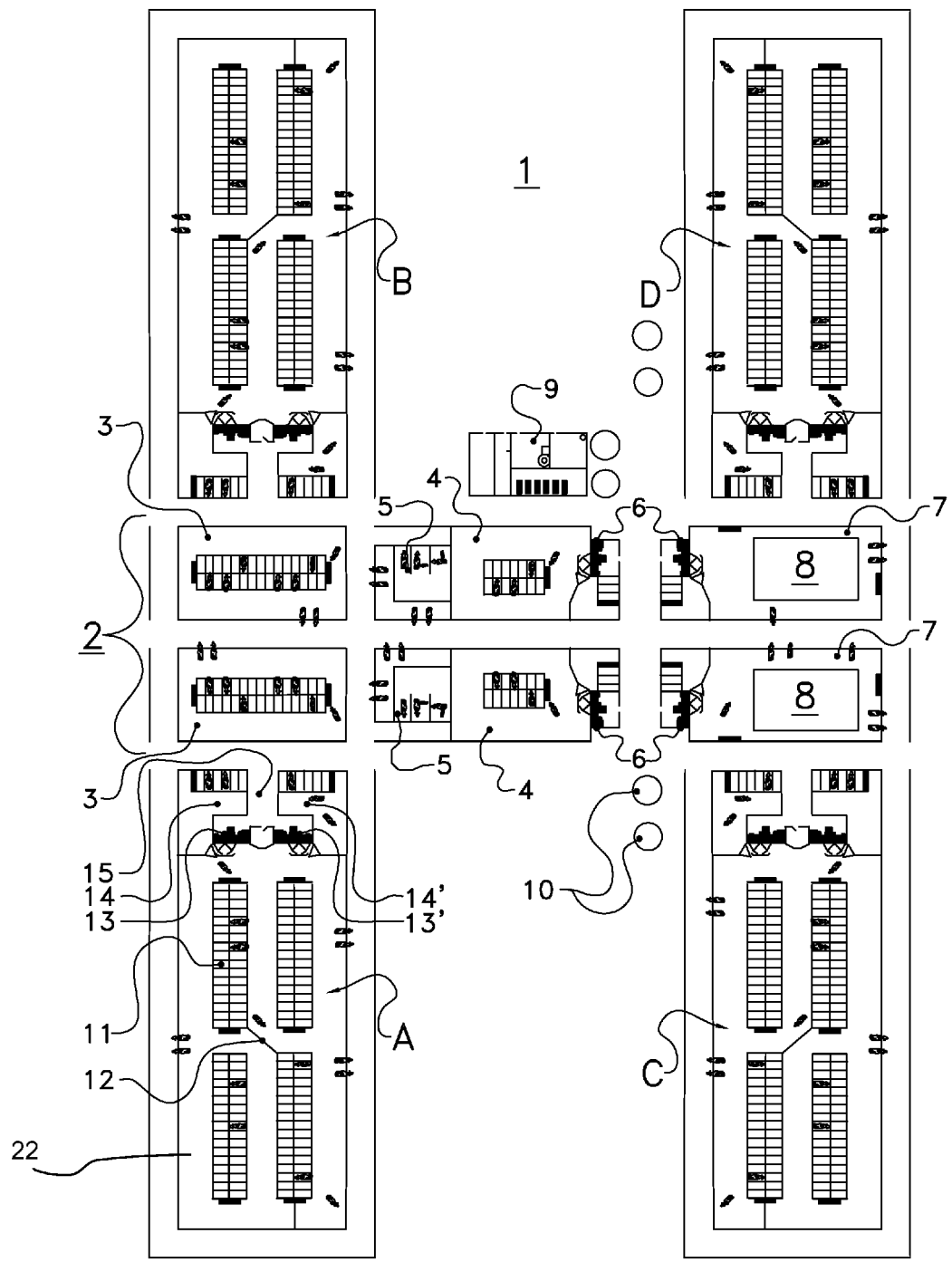
FIG. 1 is a diagrammatic top view of an example of an implement according to the invention.

The following is a description of certain embodiments of the invention, given by way of example only and with reference to the drawings. FIG. 1 is a diagrammatic top view of an example of an implement 1 according to the invention. Here, 2 designates a care unit, and A to D are production units.

The care unit 2 comprises two dry animal units 3, two calving units 4 and two infirmary units 7. The dry animal units 3 comprise not further designated boxes and feeding devices for the dairy animals. The calving units 4 comprise, besides a general area, also calving boxes 5, as well as a milk box 6. The infirmary units 7 comprise, for example, a cubicle 8 and also a milk box 6. The production units A to D comprise boxes 11, a partition 12, a first milk box 13 and a second milk box 13', a first segregation area 14 and a second segregation area 14', as well as a clean access area 15. Furthermore, there are optionally provided an office/storage area 9, as well as a milk storage in the form of tanks 10.

It should be noted that the dry animal units 3 do not necessarily constitute part of the care unit 2. For, dry dairy animals require only very little care, in practice hardly more than, preferably automated, feeding and from time to time a control visit. For this reason, the dry animal units 3 may be provided even most remotely from the rest of the care unit 2. Nevertheless, it may also offer advantages to provide the dry animal unit as shown in FIG. 1, for example if groups of animals are treated as described in the above-mentioned not published Dutch patent application. The route to be covered then remains limited.

The calving unit 4 comprises calving boxes 5 for just calved animals, as well as a general area for animals that are about to calve. The milking implement provided in the milk box 6 serves to milk mother animals that have just calved. Firstly, colostrum can thus be collected and supplied to the calves, and secondly, by means of a specific milking regime, the milk production can have a good start. Besides, it is beyond dispute that the animals require extra attention and care in the calving period.

The infirmary units 7 comprise segregated dairy animals, for example sick animals, wounded animals, too nervous animals, or animals that require otherwise extra attention, for example dairy animals having a deviating number of teats, etc. Care specifically attuned to these animals may be provided in the form of special cubicles 8, etc. Isolated areas may be provided, if desired. The also provided milking implement in the milk box 6 could, for example, be provided with special, additional or more sensitive measuring equipment for monitoring health and/or milk quality.

The production units A to D accommodate large numbers of dairy animals. These may, if desired, be subdivided into two or more subgroups, such as with the aid of the only partially shown partition 12. Of course, there should be provided for each subgroup at least one milk box 13, 13' comprising a milking implement, and advantageously at least two, so that dairy animals have at least a chance of being milked, also in the case of a failure. Other components that are normally present, such as milk lines for conveying the collected milk to storage tanks 10, are not shown. Feeding devices, preferably automatic feeding devices, are neither depicted.

Each production unit A, B, C, D comprises two milk boxes 13 provided with a milking implement, as well as two segregation areas 14, for example for animals that could not be milked or whose milk or milking behaviour indicates that they are ill. If necessary, these animals can subsequently be transferred to the infirmary units 7. There may also be provided different numbers of milking robots, such as three or four per production unit. It should furthermore be noted that the production units are substantially elongate, in order thus to guarantee sufficient ventilation. The intermediate areas between the units A, B, C, D also serve this purpose.

In the embodiment shown, there is provided a segregation area 14, 14' per milk box 13, 13'. This makes it possible, by means of a simple selection device (not specifically shown), not to lead a-to-be segregated dairy animal back to the accommodation area 22, but to lead it to the segregation area 14, 14'. It is advantageous to provide this device at an outer side of the production unit. In the case of an infectious disease, it is not only possible thus to limit the danger of infection of healthy animals, but also the route to be covered if transfer to an infirmary unit or the like is necessary.

There is further shown a clean access area 15 which gives access to the milking robots without having to walk through the accommodation area 22 of the production unit. Said access area may also serve as a further separation of the segregation area 14, 14'.

Figure 2:
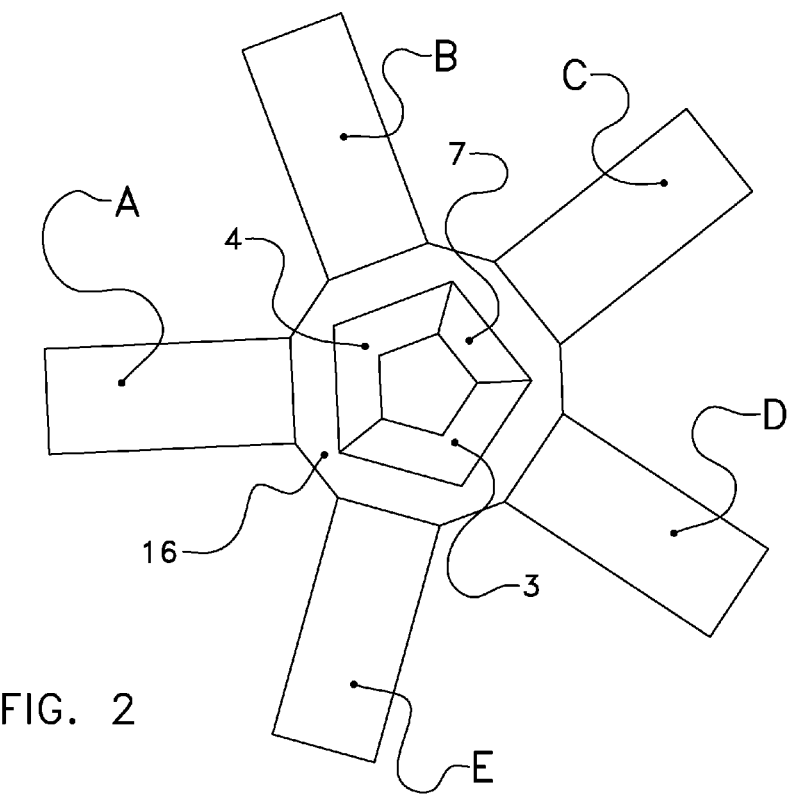
FIG. 2 is a diagrammatic top view of an alternative implement.

FIG. 2 is a diagrammatic top view of an alternative implement. It comprises five production units A to E, provided with a centrally located care unit, also in this case comprising a dry animal unit 3, a calving unit 4 and an infirmary unit 7, surrounded by a passageway or corridor 16.

The units A to E need not be set up simultaneously, but may also be built successively, according to one's needs, starting from the central unit. In this case, the central unit has a pentagonal configuration, so that quadruple extension is possible. Incidentally, such a total pentagonal configuration is less efficient with regard to the total surface use than the embodiment shown in FIG. 1. On the other hand, a central passageway 16, in particular a covered passageway, has advantages upon transferring animals, and in particular groups of animals, from one subunit 3, 4, 7 to another, or from or to a production unit A-E. Of course, triangular, quadrangular or hexagonal or polygonal dispositions are possible as well.

Figure 3:
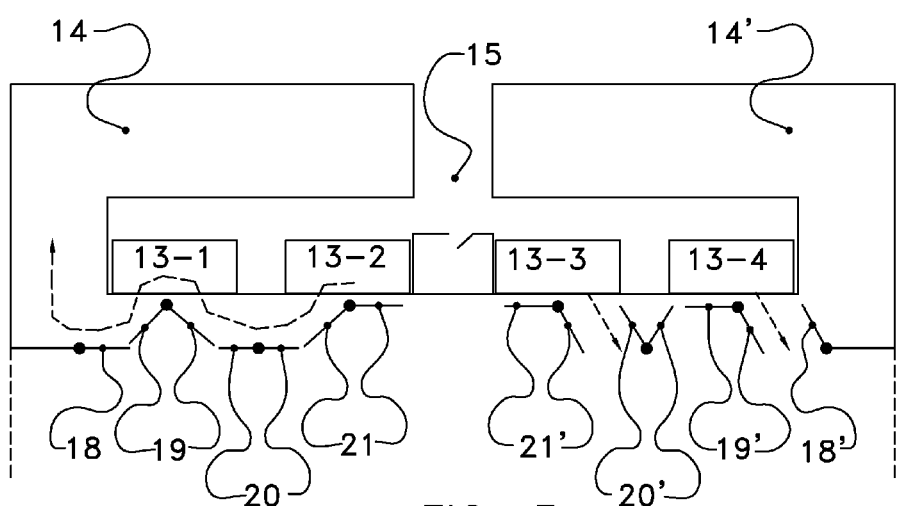
FIG. 3 is a diagrammatic and enlarged view of a detail of an implement according to FIG. 1.

FIG. 3 is a diagrammatic and enlarged view of a detail of an implement according to FIG. 1, with regard to the disposition of milk boxes 13 at a clean access area 15. Incidentally, FIG. 3 actually shows a larger number of milk boxes than the number in FIG. 1, which, for reasons of clarity, is in each case limited to two. Here it holds, like in all the other figures, that similar components are designated by the same or corresponding reference numerals.

Besides the milk boxes 13-1 to 13-4, the first and second segregation areas 14 and 14' and the clean access area 15, the implement shown comprises in each case a first selection gate 18, 18', as well as in each case two second, third and fourth gates 19/19', 20/20' and 21/21', respectively.

In the position shown in FIG. 3 on the left, the milk box 13-2 accommodates a dairy animal that should be segregated to the area 14. Of course, this is not permitted via the clean access area 15, and neither via the accommodation area 22, because, in that case, the animal is, of course, not led. By now bringing the gates 19 to 21 into the proper, shown position, the dairy animal will cover the route indicated by the dashed line, and arrive, via the milk box 13-1, in the segregation area 14. The condition is, of course, that said milk box 13-1 is not occupied, but this condition can, if need be with some waiting time, always be met. It is pointed out that, if there are provided per clean access area more milk boxes than segregation areas, it is advantageous to provide such a controllable passage from a milk box to a segregation area. However, also if no clean access area is provided at all, such a led disposition has advantages. Moreover, such a disposition has the mentioned advantages, both with conventional milking implements in the milk boxes and with milking robots. It is further pointed out that, instead of a single segregation area 14, there may also be provided a plurality of segregation areas at the place of the single area 14, for example to segregate sick animals from animals which were only not successfully milked. For this purpose, only the selection gate 18 should be arranged differently. It should be appreciated that one of ordinary skill in the art will be able to configure other arrangements. In particular the gates 20 may also be arranged in a different manner, such as a single shiftable fencing or the like.

In FIG. 3 on the right, the "normal" position of milk boxes 13-3 and 13-4 is shown mirrorwise. In this case, dairy animals are each time milked without having to be segregated, so that they can return to the accommodation area 22. The gates 18' to 21' may then, for example, assume the shown position.

Figure 4:
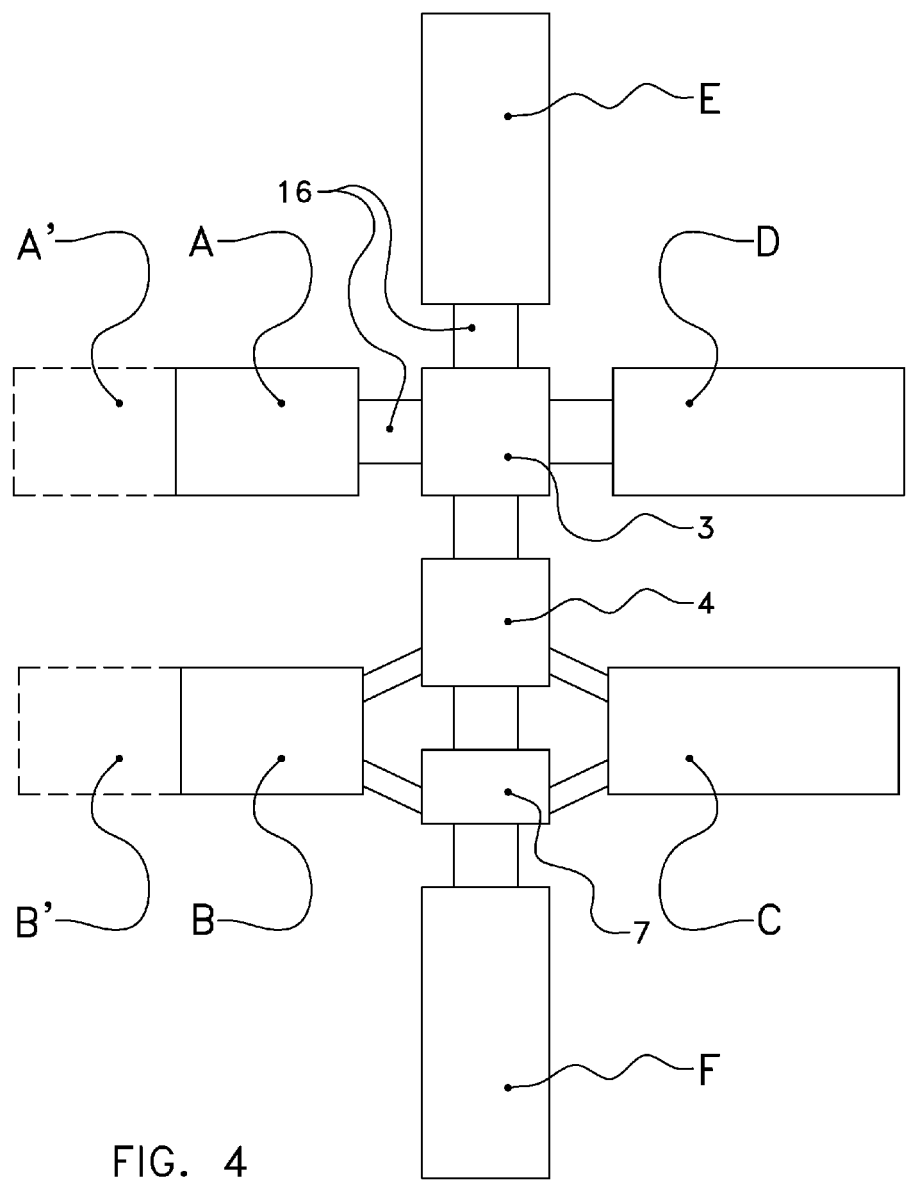
FIG. 4 is a diagrammatic top view of an alternative implement according to the invention.

FIG. 4 is a diagrammatic top view of an alternative implement according to the invention. It comprises six production units A-F and the already above mentioned subunits 3, 4 and 7, interconnected by means of corridors 16.

The disposition comprising six units is very favourable in relation to the number of production units to be connected to the care unit 2, although also for five units this still holds to a great extent. There are still extension possibilities, in the form of elongations A', B', etc.

Incidentally, the corridors shown are not necessary. Without them there is a better mutual separation of the units, while they per se better isolate the implement as a whole from the external world. Moreover, there may also be provided separate corridors, such as from a segregation area (not separately designated) in production units B and C to the infirmary unit 7.

The invention relates to implements for dairy animals, wherein the dairy animals may, for example, be cows, but also goats, sheep, buffalos, etc. The implement shown in FIG. 1 accommodates, for example, more than 300 cows, but other dimensions are possible, of course. For the entire figure description it holds that a milking implement may be a conventional milking implement. However, it is preferably a milking robot, so that the labour-saving advantages of the invention show up well. In the embodiment shown, there are provided freely accessible boxes as accommodations for the animals. Other accommodations may, of course, be used as well, for example in the form of tied-up stalls or the like. It further holds that favourable characteristics of all embodiments shown may be mutually combined, unless explicitly excluded in the description.

Thus, the invention has been described by reference to certain embodiments discussed above. It will be recognized that these embodiments are susceptible to various modifications and alternative forms well known to those of skill in the art. Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. An implement for keeping dairy animals, comprising:
   four production units,
   a care unit comprising at least one dry animal unit, at least one calving unit having at least one milking robot located at the side of the unit, and at least one infirmary unit having at least one milking robot located at the side of the unit,
   wherein each production unit is provided with an accommodation area for a production group, wherein the production group comprises a group of lactating dairy animals, and at least one milking robot for milking the production group accommodated in the accommodation area of said production unit,
   wherein
      the calving unit is for separate accommodation of at least one dairy animal in a calving period,
      the at least one milking robot of the at least one calving unit is for milking at least one just calved dairy animal,
      the infirmary unit is for separate accommodation of at least one sick animal,
      the dry animal unit is for separate accommodation of at least one dry dairy animal
   wherein each production unit is elongate and has a short side that faces the care unit, wherein the four production units and the care unit are disposed in H-shape,
   wherein the care unit forms a walkable connection between the production units, and
   wherein the milking robots of two production units are contiguous to the dry animal unit and the milking robots of the other two production units are contiguous to the infirmary unit.

2. The implement according to claim 1, wherein the care unit comprises an area provided with a free cubicle.

3. The implement according to claim 1, wherein each production unit comprises two accommodation areas for the production group.

4. The implement according to claim 1, further comprising a passage that forms a connection between two subunits or between a production unit and the care unit, and comprising a controlling computer for controlling the passage.

5. The implement according to claim 4, wherein the passage comprises an identification device to identify a dairy animal and let the dairy animal pass selectively.

6. The implement according to claim 1, wherein at least one production unit comprises at least two milk boxes, one clean access area, separated from the accommodation area, for access to the milk boxes, and at least one segregation area, separated from the accommodation area and the clean access area, for dairy animals to be segregated from the production group, wherein, between milk boxes, there is provided a controllable passage which is arranged to lead a to be segregated dairy animal from a first milk box, via a second milk box, to the segregation area.

7. The implement according to claim 6, wherein at least the number of milking boxes are larger than the number of segregation areas.

8. The implement according to claim 1,
wherein each production unit comprising:
at least one segregation area, separated from the accommodation area, for dairy animals to be segregated from the production group,
a first milk box located next to the segregation area,
a second milk box not directly located next to the segregation area,
a control unit, and
a controllable passage which is provided between the first and second milk boxes, wherein the controllable passage comprises gates which can be controlled by the control unit, wherein the control unit is configured so as to control the gates of the controllable passage in such a manner that if the first milk box accommodates a dairy animal which is to be segregated, said dairy animal to be segregated is led from the second milk box, via the controllable passage and through the first milk box, to the segregation area.

9. The implement for keeping dairy animals according to claim 8, wherein at least one of the milk boxes comprises a milking robot for automatically connecting teat cups to the teats of the dairy animal.

10. The implement for keeping dairy animals according to claim 8, wherein the implement comprises a clean access area separated from the accommodation area for allowing an operator access to the milk boxes.

11. The implement for keeping dairy animals according to claim 8, wherein the number of milk boxes is larger than the number of segregation areas.

12. The implement for keeping dairy animals according to claim 8, wherein the control unit is configured so as to control the gates of the controllable passage in such a manner that if the first milk box accommodates a dairy animal which is not to be segregated, said dairy animal not to be segregated is led from the first milk box via the controllable passage to the accommodation area without passing through the second milk box.

13. The implement for keeping dairy animals according to claim 1, wherein the at least one accommodation area comprises at least two milking robots for milking dairy animals of the production group.

\* \* \* \* \*